Patented Dec. 14, 1943

2,336,984

UNITED STATES PATENT OFFICE 2,336,984

PRINTING INK

Donald Robert Erickson and Paul J. Thoma, Kalamazoo, Mich., assignors to Michigan Research Laboratories, Inc., Kalamazoo, Mich.

No Drawing. Application June 25, 1943,
Serial No. 492,306

1 Claim. (Cl. 106—30)

This invention relates to improvements in printing ink.

This invention is a continuation in part of application Serial No. 396,296 filed June 2, 1941, for Printing ink.

This invention relates to printing ink and particularly to the type of ink disclosed in United States Patent No. 2,244,103, issued June 3, 1941, in which the binder comprises a resin comprising a rosin modified with an alpha beta unsaturated organic polybasic acid such as maleic or fumaric and the solvent consists of diethylene glycol or some other liquid polyglycol and in which the application of water to the ink will prevent offset but in which the ink will not set up on the press because of water tolerance due to the fact that the binder, which is insoluble in water, is soluble in the solvent and a limited quantity of water, but not in the solvent with an unlimited quantity of water.

It has for its objects:

First, to provide a new and improved printing ink.

Second, to provide such an ink which has improved and controllable water tolerance in that the binder is soluble in the solvent with a greater quantity of water than in the case of the ink of the aforesaid type.

Third, to provide such an ink which uses relatively inexpensive materials and in which the addition of relatively more expensive materials gives the desired result, thus keeping the cost of the ink at a minimum.

Further objects and advantages pertaining to details will appear from the description to follow.

We have found that the water tolerance of an ink in which the varnish is composed of a resin comprising a rosin modified with an alpha beta unsaturated organic polybasic acid such as maleic or fumaric and in which the solvent therefor consists of a liquid polyglycol such as diethylene glycol or another relatively low molecular weight liquid polyglycol may be increased so as to insure against setting up of the ink on the press and to give extra and finer control of the ink for various climatic conditions by adding thereto small amounts of high molecular weight polyglycols which are solid at normal room temperatures.

These high molecular weight solid polyglycols are relatively more expensive than the liquid lower molecular weight polyglycols such as diethylene glycol, but a small amount only of such solid polyglycols is necessary to give the increased water tolerance. It is less expensive to use these high molecular weight solid polyglycols in the ink in which diethylene glycol is used as a solvent than would be the case if the solvent were selected from higher molecular weight liquid polyglycols, and a highly desirable increase in water tolerance is thus obtained at a relatively low cost.

The addition of the high molecular weight solid polyglycols, in addition to tending to keep the ink open longer on the press, also tends to give better working bodies of the ink but does not appreciably cut down the setting time for inks after they have been printed and are treated with water, either in the form of sprays or steam in order to prevent offset.

We have found that from approximately ½% to 10% of the high molecular weight polyglycols can be used and that by varying the amount the water tolerance can be adjusted to suit the exact conditions and the type of press on which the ink is to be printed.

An example of our invention consists in using 100 parts by weight of varnish made from 50% by weight of diethylene glycol and 50% by weight of a resin comprising a rosin modified with an alpha beta unsaturated organic polybasic acid, such as maleic, as described in United States Patent 2,063,542, issued December 8, 1936, to Carleton Ellis, for Diene resin. A suitable product is sold under the trade name "Teglac 127." This material has a high acid number, to-wit, about 300. The acid number of this product may vary and run down as low as 200 and still give satisfactory results.

To this varnish, we add 2 parts by weight of a solid polyglycol having a molecular weight of 1500. Such a polyglycol is sold under the trade name "Carbowax 1500."

Instead of using the polyglycol with a molecular weight of 1500, we can use other polyglycols with varying molecular weights, as long as they are solid at room temperatures, to give highly satisfactory results. For printing in very high relative humidity conditions or when printing by the dry offset method where ink films are very thin, we can use up to 10% of this solid polyglycol with very favorable results.

The above mentioned high molecular weight polyglycols are solid waxy materials of the same general formula as the lower liquid polyglycols such as diethylene glycol.

In place of the diethylene glycol, other liquid polyglycols can be used as the solvent, although the diethylene glycol is readily available and is inexpensive. It has the desired properties as a solvent in the printing ink.

To the varnishes above described, the desired quantity of pigment is added. 15% to 20% by weight of carbon black may be added. 60% by weight of chrome yellow may be added. Other pigments may be used to give different colors and the amounts will vary in accordance with the colors and intensities desired.

The addition of the high molecular weight solid polyglycols is effective in the above varnishes. It is also effective in inks made up of varnishes consisting of 80 parts of the above described varnish to which may be added 20 parts of varnishes consisting of 50% by weight of diethylene glycol and 50% by weight of phenolic resins such as that which is sold under the trade name "Phenolic Resin 13109." The 20 parts of varnish may use as the binder also 50% by weight of gum or wood rosin, or of urea-formaldehyde condensation product, or melamine-formaldehyde condensation product, or a modified glycerol phthalate condensation product sold under the trade name "Rezyl 1145–51," or shellac.

To 80 parts of the first described varnishes, one may also add 20 parts of a varnish comprising 80% diethylene glycol and 20% of zein, or 80% of diethylene glycol and 20% of zein treated with an alpha beta unsaturated organic polybasic acid such as maleic or fumaric, or an organic hydroxy acid.

In place of the binder comprising a rosin modified with an alpha beta unsaturated organic polybasic acid such as maleic or fumaric, one may use a resin comprising a terpene hydrocarbon of the formula $C_{10}H_{16}$ such as alpha terpinene, beta terpinene, pinene, alpha pinene, beta pinene, dipentene, limonene, or terpinolene, reacted with maleic or fumaric acid. Such a product may be obtained under the trade name "Petrex Acid."

It is also possible to use as the binder, mixtures of the resin comprising the rosin modified by the alpha beta unsaturated organic polybasic acids and the terpene hydrocarbon of the formula $C_{10}H_{16}$ modified by such an acid.

It is also possible to use the resin comprising the above mentioned modified terpene hydrocarbon of the formula $C_{10}H_{16}$ alone as the binder.

The terms and expressions which have been herein employed are used as terms of description and not of limitation. There is no intention in the use of such terms of excluding any equivalents of the features shown and described, or portions thereof. It is recognized that various modifications are possible within the scope of the invention claimed.

Having thus described our invention, what we claim as new and desire to secure by Letters Patent is:

A non-offsetting printing ink comprising a varnish comprising a liquid polyglycol as a solvent for the resin, a resin as a binder selected from the group consisting of rosin modified with an alpha beta unsaturated organic polybasic acid and a terpene hydrocarbon of the formula $C_{10}H_{16}$ modified with an alpha beta unsaturated organic polybasic acid in sufficient amount to form, when subjected to steam immediately after printing, a thin hard film over the exposed surface of the printed film, from ½% to 10% of a solid polyglycol, and a pigment insoluble in water.

DONALD ROBERT ERICKSON.
PAUL J. THOMA.